(12) United States Patent
Rau (10) Patent No.: US 11,940,100 B2
(45) Date of Patent: Mar. 26, 2024

(54) TANK DEVICE FOR STORING A GASEOUS MEDIUM

(71) Applicant: Robert Bosch GmbH, Stuttgart (DE)

(72) Inventor: Andreas Rau, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 503 days.

(21) Appl. No.: 17/275,256

(22) PCT Filed: Jul. 17, 2019

(86) PCT No.: PCT/EP2019/069272
§ 371 (c)(1),
(2) Date: Mar. 11, 2021

(87) PCT Pub. No.: WO2020/052835
PCT Pub. Date: Mar. 19, 2020

(65) Prior Publication Data
US 2022/0034454 A1 Feb. 3, 2022

(30) Foreign Application Priority Data
Sep. 11, 2018 (DE) .................... 10 2018 215 384.1

(51) Int. Cl.
F17C 13/04 (2006.01)

(52) U.S. Cl.
CPC ...... *F17C 13/04* (2013.01); *F17C 2205/0326* (2013.01); *F17C 2205/0332* (2013.01);
(Continued)

(58) Field of Classification Search
CPC .............. F17C 13/04; F17C 2205/0326; F17C 2221/012; F17C 2223/0123; F17C 2270/0184; F16K 31/0651
(Continued)

(56) References Cited

U.S. PATENT DOCUMENTS

| 6,675,831 | B2 | 1/2004 | Sakaguchi et al. |
| 8,561,644 | B2 * | 10/2013 | Schultz ..................... A01J 5/14 137/596.17 |

(Continued)

FOREIGN PATENT DOCUMENTS

| CN | 2324353 Y | 6/1999 |
| CN | 102162545 A | 8/2011 |

(Continued)

OTHER PUBLICATIONS

Translation of International Search Report for Application No. PCT/EP2019/069272 dated Nov. 14, 2019 (2 pages).

*Primary Examiner* — Rafael A Ortiz
*Assistant Examiner* — Sanjidul Islam
(74) *Attorney, Agent, or Firm* — Michael Best & Friedrich LLP (57) ABSTRACT

The invention relates to a tank device (1) for a gaseous medium, comprising a valve device (2) and a tank (10), wherein the valve device (2) has a valve housing (20) with a longitudinal axis (11). The valve housing (20) is equipped with an inner chamber (7), in which a main valve element (16) is arranged in a movable manner along the longitudinal axis (11), said main valve element (16) interacting with a first valve seat (40) and thus forming a main valve (43). An actuation valve element (18) which can be moved along the longitudinal axis (11) is arranged coaxially to the main valve element (16), said actuation valve element (18) interacting with a second valve seat (41) in order to open and close an inlet opening (160) and thus forming an actuation valve (44). The valve device (2) additionally comprises a magnet coil (14). Furthermore, the inlet opening (28) is arranged in the valve housing (20) coaxially to an outlet opening (30), whereby the gaseous medium can flow against the valve device (2) or a away therefrom axially to the longitudinal axis (11), and the magnet coil (14) is arranged in the valve housing (20) and surrounds the main valve element (16) and the actuation valve element (18).

14 Claims, 5 Drawing Sheets

(52) U.S. Cl.
CPC ............... *F17C 2205/0391* (2013.01); *F17C 2221/012* (2013.01); *F17C 2223/0123* (2013.01); *F17C 2260/036* (2013.01); *F17C 2270/0184* (2013.01)

(58) Field of Classification Search
USPC ....... 137/315.03; 251/30.01, 30.04; 220/202, 220/230, 203.27, 203.23, 203.19, 203.01
See application file for complete search history.

(56) References Cited

U.S. PATENT DOCUMENTS

| | | | | |
|---|---|---|---|---|
| 8,641,153 | B2* | 2/2014 | Voss | F16K 31/0662 |
| | | | | 303/119.2 |
| 2002/0104572 | A1* | 8/2002 | Sen | F16K 31/0613 |
| | | | | 137/625.65 |
| 2006/0219298 | A1 | 10/2006 | Suzuki | |
| 2009/0236551 | A1 | 9/2009 | Nomichi et al. | |

FOREIGN PATENT DOCUMENTS

| | | | |
|---|---|---|---|
| CN | 102162547 | A | 8/2011 |
| CN | 105089892 | A | 11/2015 |
| EP | 2857727 | A1 | 4/2015 |
| JP | 2001525034 | A | 12/2001 |
| JP | 2005264966 | A | 9/2005 |
| JP | 2013113366 | A | 6/2013 |
| JP | 2016513205 | A | 5/2016 |
| WO | 2016156518 | A1 | 10/2016 |

* cited by examiner

TANK DEVICE FOR STORING A GASEOUS MEDIUM

BACKGROUND OF THE INVENTION

The invention relates to a tank device for a fuel cell tank, in particular for storing hydrogen, e.g. for use in vehicles with a fuel cell drive.

DE 10 2018 209 057 A1, which is not a prior publication, describes a tank device for temperature pressure relief of a fuel cell tank, wherein the tank device comprises tank containers with different valves, e.g. a shut off valve, which ensure correct functioning of a fuel cell system, for example.

The safety devices for a tank device of this kind are standardized. In this context, each tank device must have a shut off valve of this kind. Thus, the shut off valve can seal the tank containers if there is damage to the tank device caused by an accident involving a vehicle with a fuel cell drive or if there is a break in a line of the tank device, thus preventing any gas escaping from the storage unit.

Typically, such shutoff valves have a gas feed and a gas discharge, which, by virtue of the design, are at an angle of about 90 degrees to one another. Moreover, by virtue of the design, they have a large mass and large external dimensions, which may lead to leaks or even to breakage of the shut off valve in the case of an accident owing to the high acceleration forces and deformations that occur at the shut off valve itself and at the connection thereof to the tank containers.

SUMMARY OF THE INVENTION

In contrast, the tank device according to the invention has the advantage that the robustness of the tank device is enhanced by a rotationally symmetrical construction of the shut off valve, which is integrated into the tank device.

For this purpose, the tank device has a valve device and a tank for storing a gaseous medium, e.g. hydrogen. The valve device has a valve housing with a longitudinal axis, in which valve housing is formed an inner chamber. A main valve element movable along the longitudinal axis is arranged in the inner chamber, which main valve element interacts with a first valve seat and thus forms a main valve. A pilot valve element movable along the longitudinal axis is arranged coaxially with the main valve element, which pilot valve element interacts with a second valve seat in order to open and close an inlet opening and thus forms a pilot valve. The valve device furthermore comprises a magnet coil. Moreover, the inlet opening is arranged in the valve housing coaxially with an outlet opening, whereby the gaseous medium can flow toward the valve device or away therefrom axially with respect to the longitudinal axis. Furthermore, the magnet coil is arranged in the valve housing and surrounds the main valve element and the pilot valve element.

It is thus possible to achieve a cost saving in a manner that is simple in terms of design by minimizing materials. Furthermore, it is thereby possible to reduce the dimensions and mass of the valve device. This leads to greater leaktightness and robustness of the valve device, especially in the case of an accident.

In a first advantageous development, it is envisaged that the second valve seat is formed on the main valve element. It is advantageous if the first valve seat is formed on the valve housing.

In this way, the main valve element and the pilot valve element can be integrated into the valve device in a manner which is simple in terms of design.

As a further embodiment of the invention, provision is advantageously made for the pilot valve element to be received at least partially in a recess of the main valve element. In this way, optimum operation of the entire valve device combined with a low requirement for installation space can be achieved.

In an advantageous development, it is envisaged that a flow cross section at the first valve seat is larger than a flow cross section at the second valve seat. It is thus possible in a simple manner to actuate the pilot valve element via the magnet coil without requiring a high magnetic force. Once the second valve seat has been opened, simple opening of the first valve seat without additional external forces can be ensured by reducing the pressure differences in the tank and a system arranged outside the tank device.

As a further embodiment of the invention, it is envisaged that the tank has a neck region, in which neck region a passage opening is formed and which passage opening opens into a tank interior, wherein the valve device is arranged in the passage opening. In this way, the robustness of the entire tank device can be ensured since a high stability can be achieved through the integration of the valve device into the tank. Even in the case of an accident, the valve device is protected from external influences.

As an advantageous development, it is envisaged that the inner chamber of the valve housing can be connected to the tank interior by means of the inlet opening. In this way, the valve device can convey gaseous medium from the tank or into the tank in a simple manner.

As an advantageous development, it is envisaged that the inner chamber is divided by the main valve element and the pilot valve element into a main valve chamber and a pilot valve chamber, and which main valve chamber and which pilot valve chamber can be connected to one another by means of the first valve seat and of the second valve seat. The pilot valve element advantageously has at least one transverse hole, through which transverse hole a recess of the pilot valve element can be connected to the pilot valve chamber.

As a further embodiment of the invention, it is envisaged that a pilot valve spring is arranged in the recess of the pilot valve element, by means of which pilot valve spring the pilot valve element is preloaded in the direction of the second valve seat.

As an advantageous development, it is envisaged that a main valve spring is arranged in the inner chamber, which main valve spring subjects the main valve element to a force in the direction of the pilot valve element counter to the force of the pilot valve spring.

As an advantageous development, the force of the main valve spring is less than the force of the pilot valve spring. Otherwise, the main valve spring would overcome the pilot valve spring, and the first valve seat and the second valve seat would be freed even without actuation via the magnet coil. If the force of the main valve spring is less than the force of the pilot valve spring, however, leaktightness is ensured at the first valve seat and the second valve seat.

As a further embodiment of the invention, provision is advantageously made for sealing elements to be arranged in the valve housing, by means of which sealing elements the magnet coil is sealed off from the inner chamber of the valve housing. In this way, optimum operation of the magnet coil can be achieved.

The tank device described is suitable, preferably in a fuel cell arrangement, for storing hydrogen for the operation of a fuel cell.

BRIEF DESCRIPTION OF THE DRAWINGS

Exemplary embodiments of a tank device according to the invention for storing a gaseous medium, in particular hydrogen, are illustrated in the drawing. In the drawing.

DETAILED DESCRIPTION

Figure 1:
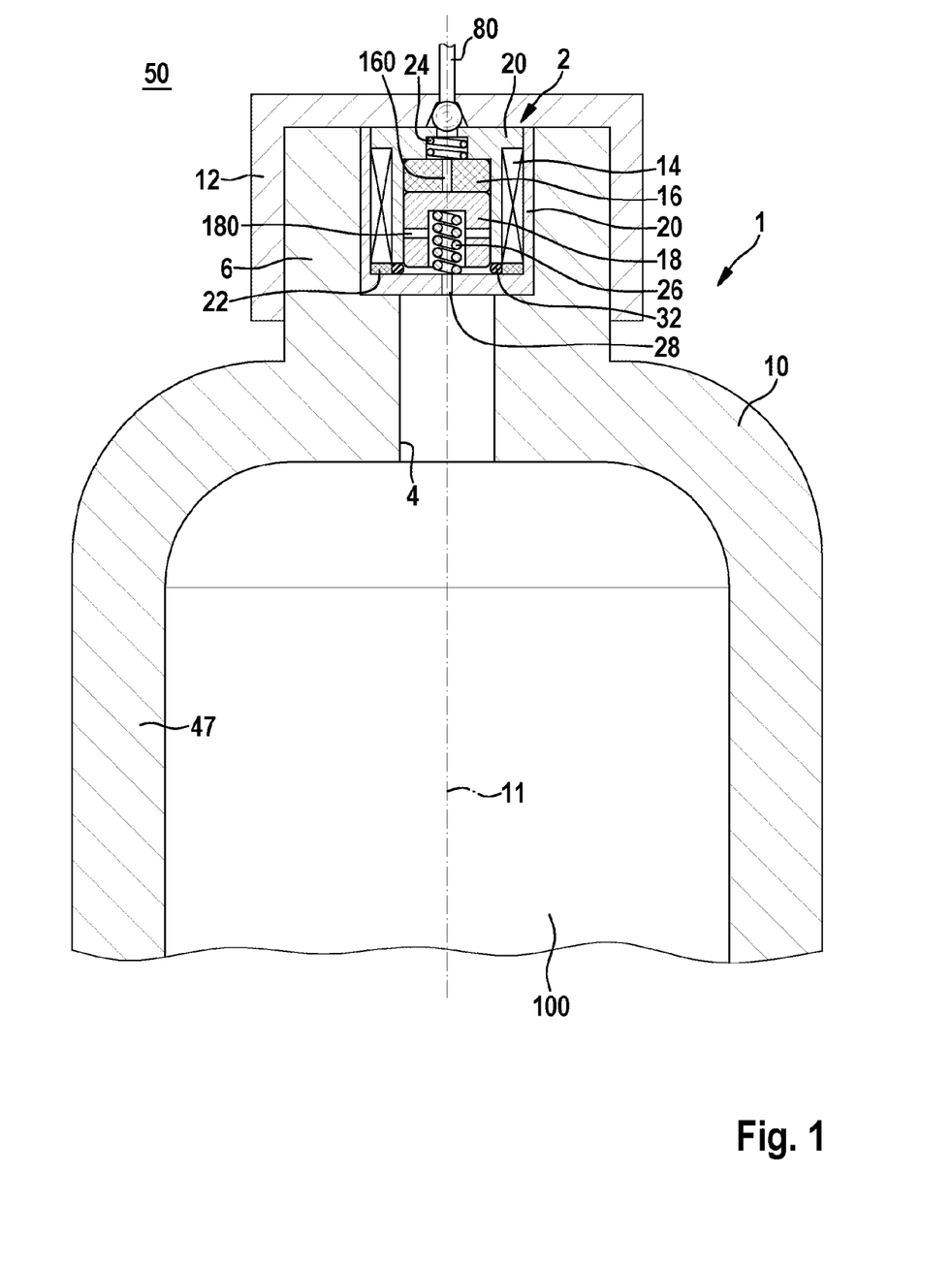
FIG. 1 shows a first exemplary embodiment of a tank device according to the invention having a valve device in longitudinal section.

A first exemplary embodiment of a tank device 1 according to the invention for a gaseous medium is shown in FIG. 1. The tank device 1 has a tank 10 and a valve device 2. The tank 10 has a tank housing 47, in which a tank interior 100 is formed. The tank housing 47 furthermore comprises a neck region 6, in which a passage opening 4 is formed. At one end, this passage opening 4 opens into the tank interior 100, in which gaseous medium, e.g. hydrogen, can be stored.

At the other end of the neck region 6 the valve device 2 is arranged in the passage opening 4 of the tank 10 and is integrated into the tank housing 47 of the tank 10. The neck region 6 is furthermore surrounded by a jacketing element 12, and therefore the valve device 2 and the tank interior 100 are sealed off from an environment 50.

In this way, gaseous medium, in particular hydrogen, can be fed, for example, to an anode region of a fuel cell in a fuel cell arrangement via the valve device 2 from the tank interior 100 via a passage 80 in the jacketing element 12.

Figure 2:
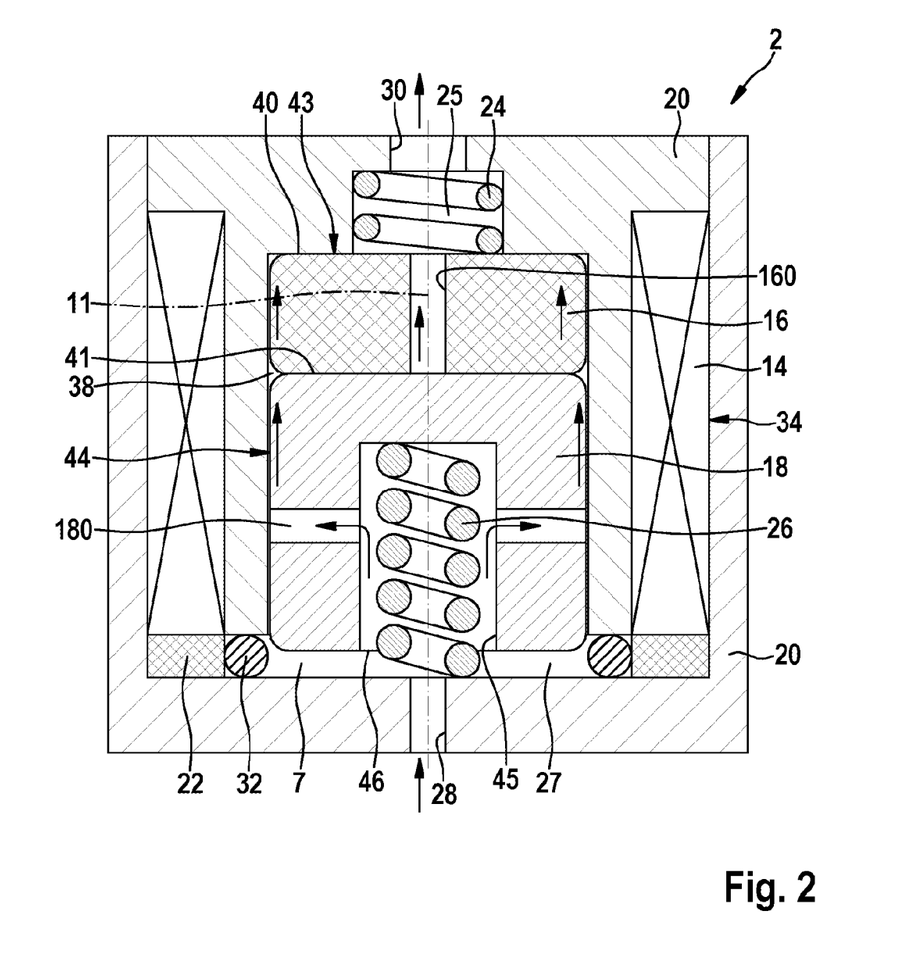
FIG. 2 shows the valve device from FIG. 1 in longitudinal section.

FIG. 2 shows an enlarged detail of FIG. 1 in the region of the valve device 2.

The valve device 2 has a valve housing 20 with a longitudinal axis 11, in which a stepped inner chamber 7 is formed. In the valve housing 20, the valve device 2 has an inlet opening 28 and an outlet opening 30, wherein the inlet opening 28 opens into the passage opening 4 of the tank 10 in the neck region 6. Here, both the inflow and the outflow of the valve device 2 occur axially with respect to the longitudinal axis 11 of the valve device 2.

Furthermore, a magnet coil 14 is accommodated and integrated in the valve housing 20, wherein the magnet coil 14 is fixed in the valve housing 20 by means of a support element 22 and is sealed off with respect to the inner chamber 7 by means of a sealing element 32 on the support element 22.

A main valve element 16 movable along the longitudinal axis 11 and, coaxially therewith, a longitudinally movable pilot valve element 18 are arranged in the inner chamber 7. The main valve element 16 and the pilot valve element 18 divide the inner chamber 7 into a main valve chamber 25 and a pilot valve chamber 27. In this case, the main valve chamber 25 opens into the outlet opening 30, whereas the pilot valve chamber 27 opens into the inlet opening 28.

An outer annular space 38, via which the pilot valve chamber 27 can be connected to the outlet opening 30, is formed between the valve housing 20, the main valve element 16 and the pilot valve element 18.

Together with a first valve seat 40 on the valve housing 20, the main valve element 16 forms a main valve 43, whereby a connection between the main valve chamber 25 and the pilot valve chamber 27 can be opened and closed. The main valve element 16 furthermore has a passage opening 160, which opens into the main valve chamber 25.

Together with a second valve seat 41, which is formed on the main valve element 16, the pilot valve element 18 forms a pilot valve 44. By means of the pilot valve 44, a further connection between the main valve chamber 25 and the pilot valve chamber 27 via the passage opening 160 can be opened and closed.

Here, a flow cross section of the gaseous medium at the first valve seat 40 is larger than a flow cross section of the gaseous medium at the second valve seat 41 since the diameter of the cylindrically formed main valve chamber 25 is larger than the diameter of the cylindrical passage opening 160.

The pilot valve element 18 furthermore has a recess 45, which is connected to the pilot valve chamber 27 by transverse holes 180 and an opening 46. Also arranged in the recess 45 is a pilot valve spring 26, which is supported, on the one hand, against the valve housing 20 and, on the other hand, against the pilot valve element 18 and which pushes the pilot valve element 18 in the direction of the second valve seat 41.

Arranged in the main valve chamber 25 is a main valve spring 24, which is supported, on the one hand, against the valve housing 20 and, on the other hand, against the main valve element 16 and which subjects the main valve element 16 to a force in the direction of the second valve seat 41.

Here, the valve housing 20 is of multipart design, and therefore the magnet coil 14 is accommodated and integrated between the multipart valve housing 20. The valve housing 20 and the pilot valve element 18 are produced from a ferromagnetic material, whereas the main valve element 16 and the support element 22 are produced from a nonferromagnetic material.

To improve gastightness, it is advantageous if the main valve element 16 is produced from plastic.

In an alternative embodiment, the main valve element 16 is produced from a metallic, nonmagnetic material.

In an alternative embodiment, flexible sealing elements are arranged on the first valve seat 40 and on the second valve seat 41 to improve gastightness.

Operation of the Valve Device

When the magnet coil 14 is not energized, the first valve seat 40 and the second valve seat 41 are closed by the force of the pilot valve spring 26, and therefore the connections between the main valve chamber 25 and the pilot valve chamber 27 are closed. Thus, it is also not possible for any gaseous medium to flow out of the tank interior 100, via the inlet opening 28 and the outlet opening 30, in the direction of a system, e.g. the fuel cell arrangement. A high pressure of 700 bar, for example, prevails in the tank interior 100. In contrast, low pressure prevails in the fuel cell arrangement.

If the magnet coil 14 is energized, a magnetic force is exerted on the pilot valve element 18, which is directed counter to the force of the pilot valve spring 26. This has the effect that the pilot valve element 18 rises from the second valve seat 41 and frees said seat. The connection between the main valve chamber 25 and the pilot valve chamber 27 via the passage opening 160 and the outer annular space 38 is now open. Gaseous medium now flows out of the tank interior 100 in the direction of the system via the second valve seat 41 (see arrows in FIG. 2). As a result, the pressure in the system rises, resulting in a reduction in the pressure difference at the main valve element 16.

However, the flow cross section at the second valve seat 41 is not sufficient to supply a system, e.g. a fuel cell arrangement, with gaseous medium, in this case hydrogen, in all operating states.

Owing to the continuously increasing pressure in the system, however, this is adjusted almost to the pressure in the tank interior 100. This has the effect that the main valve element 16 rises from the first valve seat 40 with the aid of the force of the main valve spring 24 and frees said seat. In this way, the hydrogen supply to the fuel cell is ensured since, in addition to the flow of medium via the second valve seat 41, gaseous medium can now also flow out of the tank interior 100 in the direction of the system via the first valve seat 40 and the outer annular space 38.

If the hydrogen feed to the fuel cell is to be interrupted, the energization of the magnet coil 14 is discontinued, with the result that the magnetic force is removed and the pilot valve element 18 is moved back in the direction of the second valve seat 41 by means of the force of the pilot valve spring 26 and closes said seat. Here, the pilot valve element 18 acts as a driver for the main valve element 16, thus ensuring that the first valve seat 40 is also closed again. This is possible since the force of the main valve spring 24 is less than the force of the pilot valve spring 26, and the main valve spring 24 is thus overcome by the pilot valve spring 26.

It is advantageous if the diameter at the first valve seat 40 and the stroke of the main valve element 16 are designed in such a way that the fuel cell is supplied with a sufficient mass flow of hydrogen in all operating states. Moreover, as a result, the tank 10 can be filled within a short time, e.g. in a few minutes, in the case where the tank 10 is being filled with gaseous medium, in this case hydrogen, in which case the direction of flow is from the outlet opening 30 in the direction of the inlet opening 28.

Figure 3:
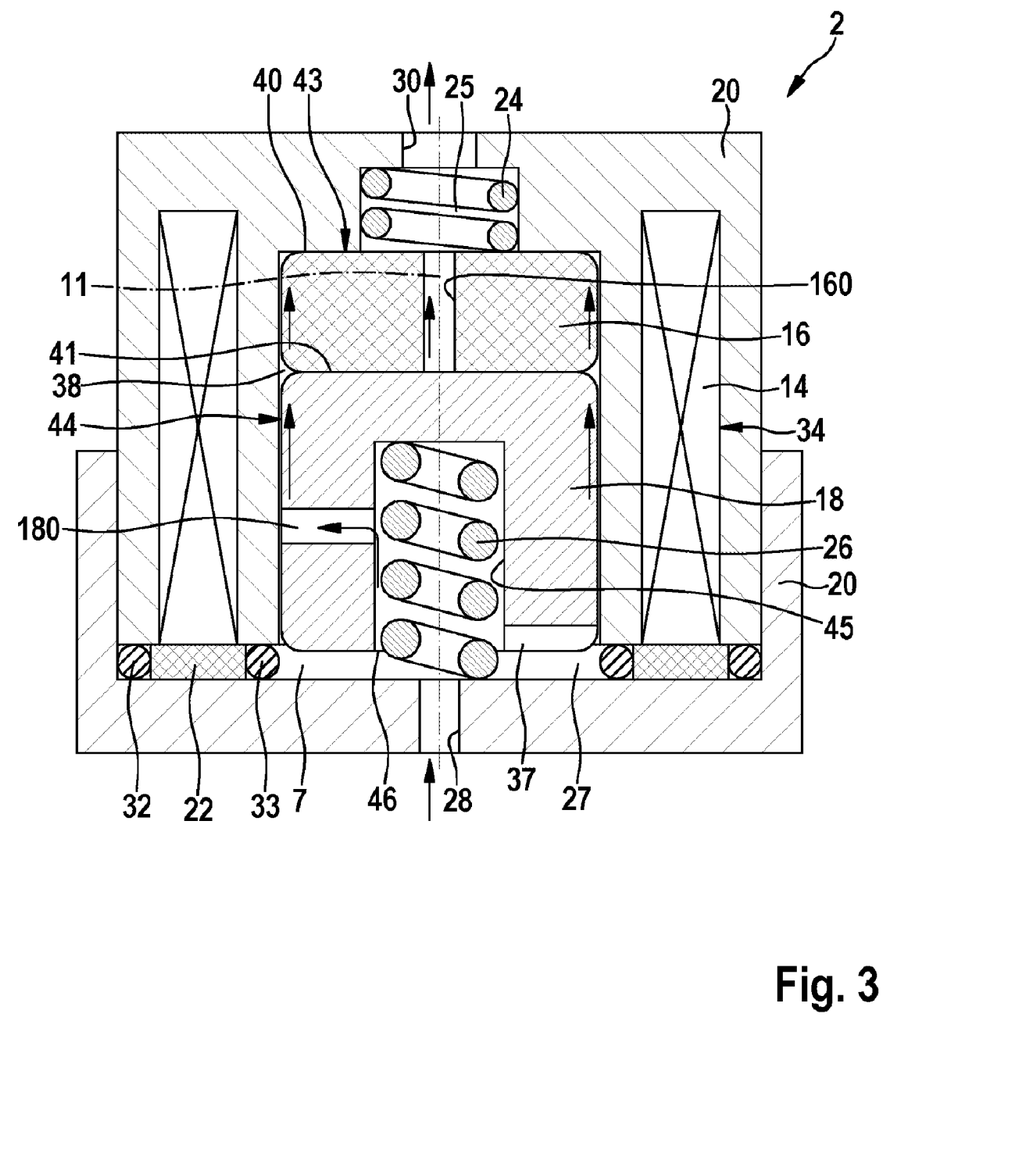
FIG. 3 shows a second exemplary embodiment of the tank device according to the invention in the region of the valve device in longitudinal section.

FIG. 3 shows a second exemplary embodiment of the tank device 1 according to the invention in the region of the valve device 2. Components with the same function have been denoted by the same reference numerals.

The second exemplary embodiment very largely corresponds in construction and operation to the first exemplary embodiment. Here, additional sealing elements 33 are installed in order to seal off the magnet coil 14 from the inner chamber 7 of the valve device 2. The pilot valve element 18 furthermore has a further recess 37 in order to ensure a high degree of pneumatic connection when the valve seats 40, 41 are open.

Figure 4:
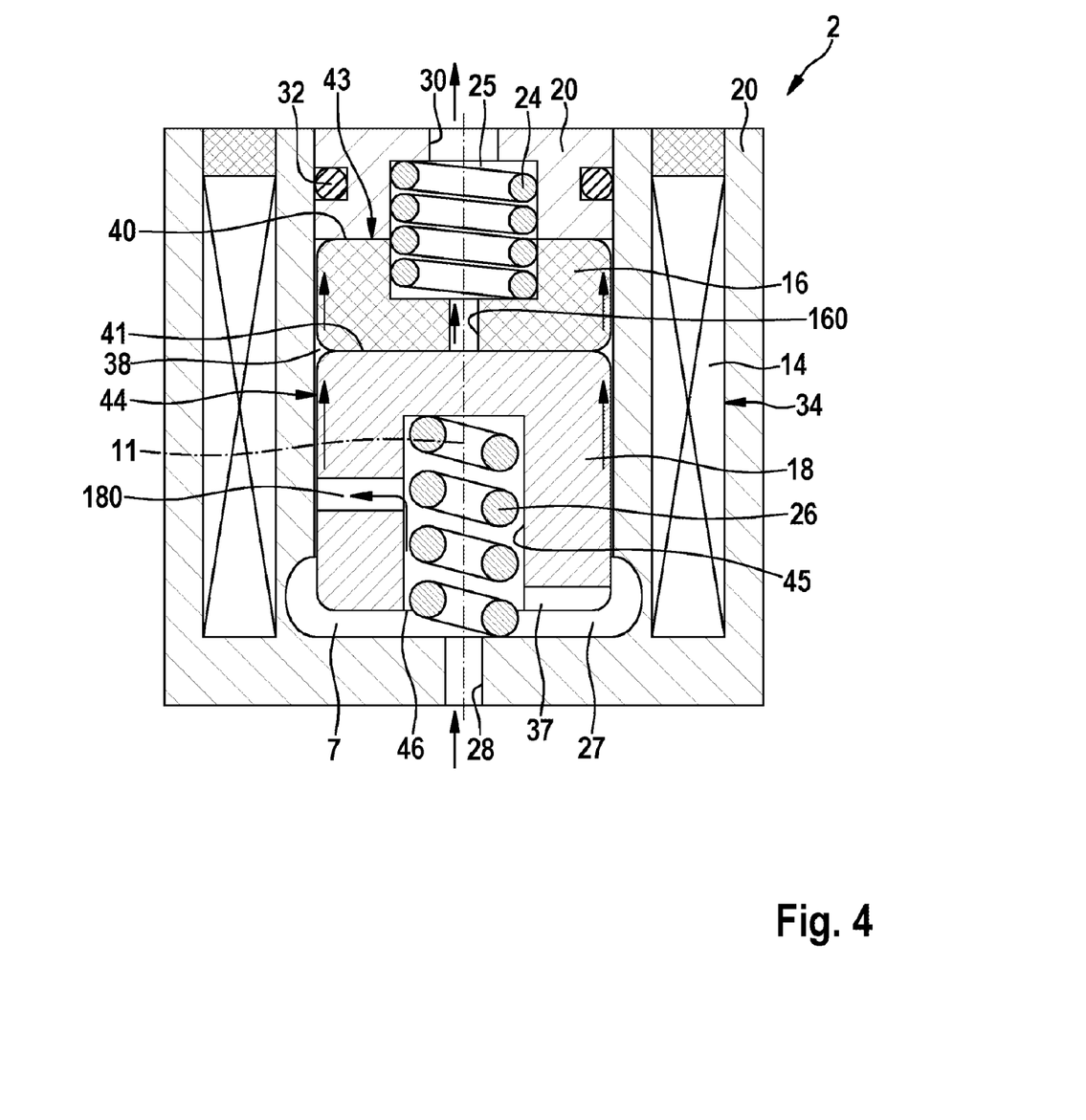
FIG. 4 shows a third exemplary embodiment of the tank device according to the invention in the region of the valve device in longitudinal section.

FIG. 4 shows a third exemplary embodiment of the tank device 1 according to the invention in the region of the valve device 2. Components with the same function have been denoted by the same reference numerals.

The third exemplary embodiment very largely corresponds in construction and operation to the second exemplary embodiment. Here, the cross section of the pilot valve chamber 27 is enlarged in order to increase the magnetic resistance and to prevent any possible magnetic short circuit. This ensures not only that the magnetic field lines build up around the magnet coil 14 and close a magnetic circuit but that the pilot valve element 18 is required to form the magnetic circuit. Correct operation of the valve device 2 is thereby ensured.

Figure 5:
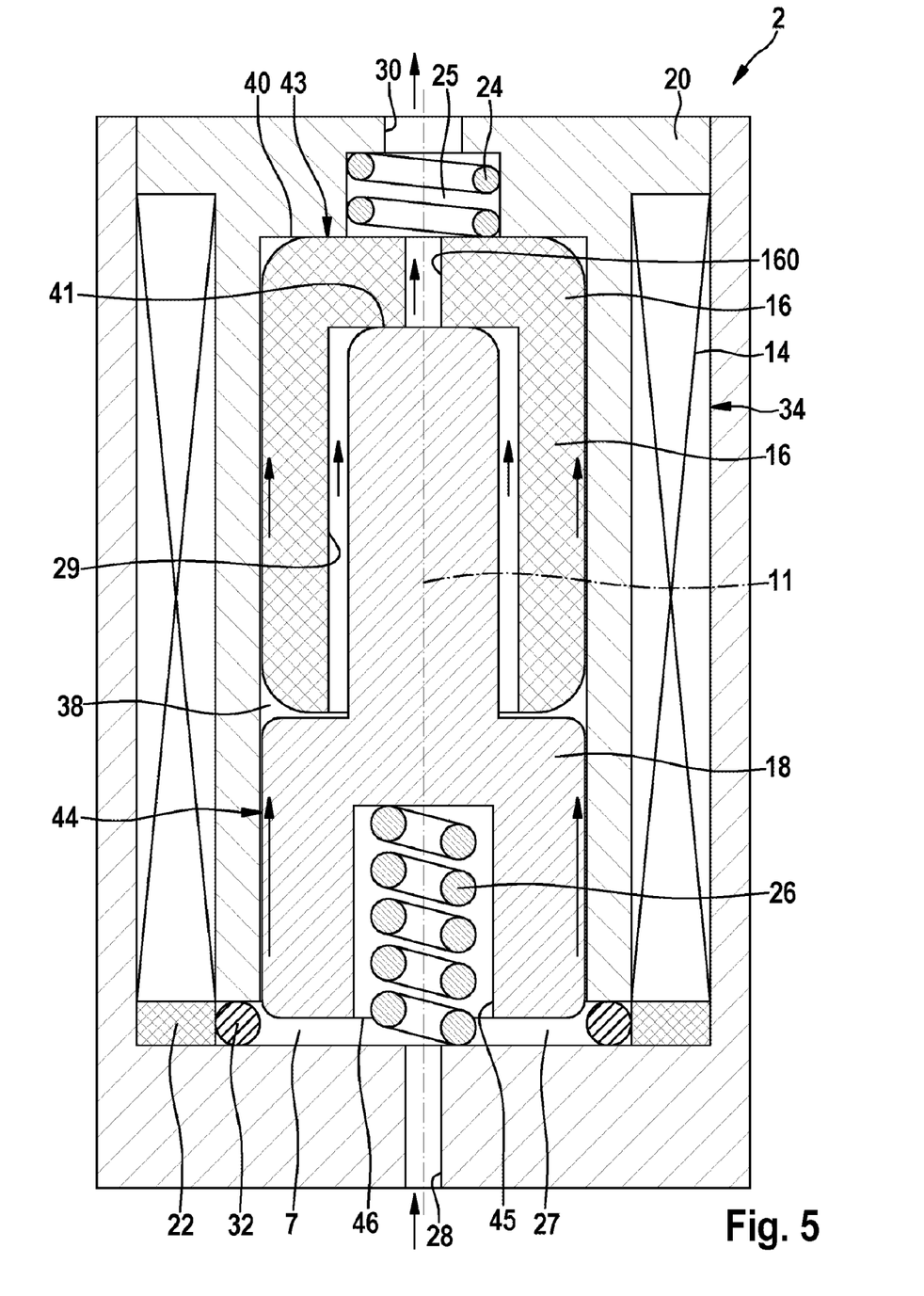
FIG. 5 shows a fourth exemplary embodiment of the tank device according to the invention in the region of the valve device in longitudinal section.

FIG. 5 shows a fourth exemplary embodiment of the tank device 1 according to the invention in the region of the valve device 2. Components with the same function have been denoted by the same reference numerals.

The fourth exemplary embodiment very largely corresponds in construction and operation to the first exemplary embodiment. In contrast to the first exemplary embodiment, the pilot valve element 18 here has no transverse holes 180. Furthermore, the main valve element 16 has a recess 29 in which the pilot valve element 18 is partially accommodated. Here, the second valve seat 41 is thus formed in the recess 29 of the main valve element 16.

The tank device 1 is not restricted to use in a fuel cell arrangement but can also be used in other systems, e.g. in vehicles with a cryogenic fuel.

The direction of flow of the hydrogen from the tank 10 is illustrated by the arrows in FIG. 2 to FIG. 5. Filling of the tank 10 with gaseous medium, in this case hydrogen, reverses the direction of flow of the hydrogen, that is to say filling takes place counter to the arrows in FIG. 2 to FIG. 5.

What is claimed is:

1. A tank device (1) for storing a gaseous medium, the tank device comprising a valve device (2) and a tank (10), wherein the valve device (2) has a valve housing (20) with a longitudinal axis (11), in which valve housing (20) is formed an inner chamber (7), in which inner chamber (7) a main valve element (16) movable along the longitudinal axis (11) is arranged, which main valve element (16) interacts with a first valve seat (40) and thus forms a main valve (43), wherein a pilot valve element (18) movable along the longitudinal axis (11) is arranged coaxially with the main valve element (16), which pilot valve element (18) interacts with a second valve seat (41) in order to open and close an inlet opening (160) and thus forms a pilot valve (44), wherein the valve device (2) comprises a magnet coil (14), characterized in that the inlet opening (28) is arranged in the valve housing (20) coaxially with an outlet opening (30), whereby the gaseous medium can flow toward the valve device (2) or away therefrom axially with respect to the longitudinal axis (11), and the magnet coil (14) is arranged in the valve housing (20) and surrounds the main valve element (16) and the pilot valve element (18).

2. The tank device (1) as claimed in claim 1, characterized in that the second valve seat (41) is formed on the main valve element (16).

3. The tank device (1) as claimed in claim 1, characterized in that the first valve seat (40) is formed on the valve housing (20).

4. The tank device (1) as claimed in claim 1, characterized in that the pilot valve element (18) is accommodated at least partially in a recess (29) of the main valve element (16).

5. The tank device (1) as claimed in claim 1, characterized in that a flow cross section at the first valve seat (40) is larger than a flow cross section at the second valve seat (41).

6. The tank device (1) as claimed in claim 1, characterized in that the tank (10) has a neck region (6), in which neck region (6) a passage opening (4) is formed and which passage opening (4) opens into a tank interior (100), wherein the valve device (2) is arranged in the passage opening (4).

7. The tank device (1) as claimed in claim 6, characterized in that the inner chamber (7) of the valve housing (20) is configured to be connected to the tank interior (100) by the inlet opening (28).

8. The tank device (1) as claimed in claim 1, characterized in that the inner chamber (7) is divided by the main valve element (16) and the pilot valve element (18) into a main valve chamber (25) and a pilot valve chamber (27), and which main valve chamber (25) and which pilot valve chamber (27) are configured to be connected to one another by the first valve seat (40) and the second valve seat (41).

9. The tank device (1) as claimed in claim 8, characterized in that the pilot valve element (18) has at least one transverse hole (180) configured to connect a recess (45) of the pilot valve element (18) to the pilot valve chamber (27).

10. The tank device (1) as claimed in claim 9, characterized in that a pilot valve spring (26) is arranged in the recess (45) of the pilot valve element (18), wherein the pilot valve spring (26) preloads the pilot valve element (18) in the direction of the second valve seat (41).

11. The tank device (1) as claimed in claim 10, characterized in that a main valve spring (24) is arranged in the inner chamber (7), which main valve spring (24) subjects the main valve element (16) to a force in the direction of the pilot valve element (18) counter to the force of the pilot valve spring (26).

12. The tank device (1) as claimed in claim 11, characterized in that the force of the main valve spring (24) is less than the force of the pilot valve spring.

13. The tank device (1) as claimed in claim 1, characterized in that sealing elements (32, 33) are arranged in the valve housing (20), wherein the magnet coil (14) is sealed off from the inner chamber (7) of the valve housing (20) by the sealing elements (32, 33).

14. A fuel cell arrangement having a tank device (1) as claimed in claim 1 for storing hydrogen for operating a fuel cell.

* * * * *